United States Patent [19]

Lund et al.

[11] Patent Number: 5,682,671
[45] Date of Patent: *Nov. 4, 1997

[54] METHOD OF ASSEMBLING A BIPOLAR BATTERY AND BIPOLAR BATTERY

[75] Inventors: David L. Lund, Minneapolis; William H. Kump, West St. Paul; Donald W. Groff, Eagan, all of Minn.

[73] Assignee: GNB Battery Technologies, Inc., Mendota Heights, Minn.

[*] Notice: The term of this patent shall not extend beyond the expiration date of Pat. No. 5,429,643.

[21] Appl. No.: 493,923

[22] Filed: Jun. 23, 1995

Related U.S. Application Data

[60] Continuation-in-part of Ser. No. 246,730, May 20, 1994, Pat. No. 5,470,679, which is a division of Ser. No. 71,298, Jun. 2, 1993, Pat. No. 5,429,643.

[51] Int. Cl.⁶ .............. H01M 6/00; H01M 2/12; H01M 10/18
[52] U.S. Cl. .............. 29/623.2; 429/82; 429/210
[58] Field of Search .............. 429/210, 72, 82; 29/623.2

[56] References Cited

U.S. PATENT DOCUMENTS

| | | | |
|---|---|---|---|
| 4,532,705 | 8/1985 | Zupancic et al. | 29/623.2 |
| 4,822,377 | 4/1989 | Wolff | 29/623.2 |
| 5,429,643 | 7/1995 | Lund et al. | 29/623.3 |
| 5,470,679 | 11/1995 | Lund et al. | 429/210 |

*Primary Examiner*—Donald R. Valentine
*Attorney, Agent, or Firm*—Leydig, Voit & Mayer, Ltd.

[57] ABSTRACT

A method of assembling a bipolar battery, most preferably a lead-acid battery, includes assembling the electrochemical components necessary to provide the necessary voltage and capacity, maintaining the electrochemical components under the desired compression and then sealing such electrochemical components as a unit utilizing various assembly components. The resulting bipolar battery in the preferred embodiment includes an electrolyte fill/vent box that seals the top of the electrochemical component unit and a vacuum box that seals the bottom surface.

34 Claims, 8 Drawing Sheets

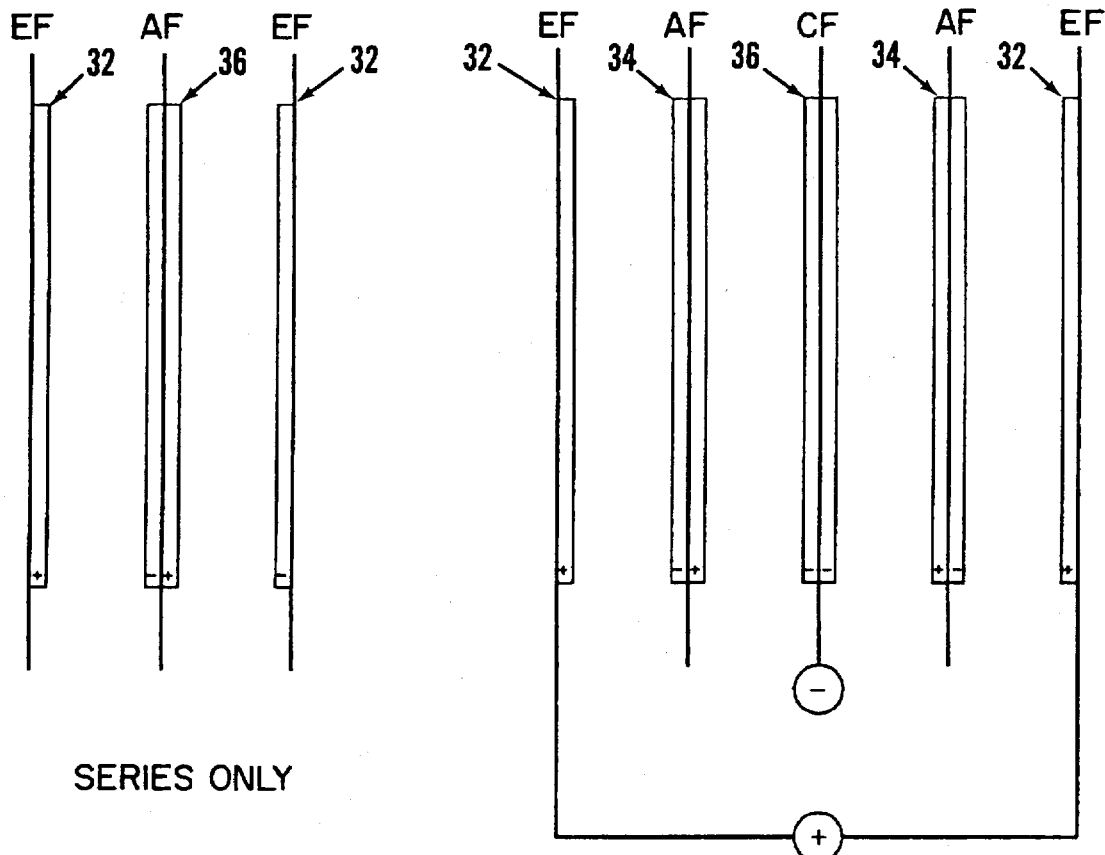

METHOD OF ASSEMBLING A BIPOLAR BATTERY AND BIPOLAR BATTERY

RELATED APPLICATIONS

This is a continuation-in-part of patent application Ser. No. 08/246,730, filed May 20, 1994, now U.S. Pat. No. 5,470,679, which is a divisional of patent application Ser. No. 08/071,298, filed Jun. 2, 1993, now U.S. Pat. No. 5,429,643.

BACKGROUND OF THE INVENTION

1. Field of the Invention

This invention relates to batteries and, more particularly, to a method of assembling a bipolar battery, such as a lead-acid bipolar battery, and the resulting battery.

2. Description of the Prior Art

Lead-acid batteries and cells have been known for a substantially long period of time and have been employed commercially in a relatively wide variety of applications. Such applications have ranged from starting, lighting and ignition for automobiles, trucks and other vehicles (often termed "SLI batteries") to marine and golf cart applications and to various stationary and motive power source applications (sometimes termed "industrial battery" applications).

The lead-acid electrochemical system has provided a reliable energy source which is capable of being manufactured in automated production while providing acceptable quality. However, one serious drawback of either the flooded or sealed, absorbed electrolyte, lead-acid batteries is the relatively low energy and power density (i.e., kilowatts/unit weight and watt-hours/unit weight, respectively) provided by such systems. It has long been a desire to provide an energy source with the reliability of a flooded or sealed lead-acid battery system while at the same time achieving much greater energy and power densities.

For this reason, considerable effort over at least the last 20 years has been directed to using lead-acid and other electrochemical systems in a bipolar design. In such a design, by definition, the positive and negative plates in some fashion share the same conductive grid or substrate.

U.S. Pat. No. 3,728,158 to Poe et al. discloses one type of a bipolar battery. Poe et al. thus state the venting of vertically stacked bipolar electrode cells presents problems not encountered in the venting of serially aligned cells such as in conventional lead-acid SLI batteries. In the conventional lead-acid batteries, the gasses generated in the cell rise to a space above the plates and from there are vented directly out of the top of each cell. Electrolyte entrainment in the gasses is minimal. In vertically stacked bipolar electrode batteries, it is stated that the gasses cannot simply be vented directly through the top of each cell. Poe et al. accordingly disclose a low silhouette, bipolar electrode battery stack in which the several cells in the stack are individually vented up the side of the battery to a venting manifold in a manner which precludes intercell electrolyte communication. Intercell dividers which prevent direct electrolyte communication between the positive plate and negative plate of any one half-cell element have a frame-like border preferably comprising a plastic material. The several half-cell elements are stacked with the contiguous frames appropriately sealed to one another by heat, solvents or adhesives.

U.S. Pat. No. 4,125,680 to Shropshire et al. discusses a variety of electrode structures that involve the use of plastic for some parts of the electrodes. U.S. Pat. No. 2,496,709 to Gelardin thus describes, as Shropshire et al. state, a duplex electrode formed of a metal plate with various types of carbon plastic coatings thereon, around which a plastic frame is injection molded. Stacks of these composite duplex electrodes are snapped together in a locking interengagement. U.S. Pat. No. 3,910,731 to Warszawski et al. and the patents cited therein are stated to describe molding a plastic frame around a preformed electrode. Other prior art referenced includes U.S. Pat. No. 2,416,576 to Franz et al., U.S. Pat. No. 2,966,538 to Bernot, U.S. Pat. No. 3,775,189 to Jaggard, and U.S. Pat. No. 3,941,615 to McDowall. Notwithstanding the prior art developments in electrochemical device design and fabrication, Shropshire et al. state that the need for easily fabricated, lightweight, multicell electrochemical devices and enhanced fabrication techniques still exists. The Shropshire et al. invention thus discloses a plurality of bipolar carbon-plastic electrode structures formed by first molding thin conductive carbon-plastic sheets from heated mixtures of specified carbon and plastic, and then establishing frames of dielectric plastic material around the sheets and sealing the frames to the sheets so as to render the resulting structures liquid impermeable. Various embodiments are illustrated. FIGS. 5 and 6 illustrate one embodiment of a stack of frames prior to and after being joined to one another. Each of the frames, except the end frame, contains a projection. FIG. 5 shows the stack prior to its elements being heat sealed to one another. Upon heat sealing, under pressure applied to the ends of the stack, the projections flatten out across the width of the frame surfaces and the resulting sealed electrochemical device is capable of retaining liquid as is shown in FIG. 6.

U.S. Pat. No. 4,964,878 to Morris discloses a method of making a recombinant lead-acid battery which comprises assembling stacks of plates in such a manner that a positive plate in a particular position in one stack is connected to a negative plate in the same relative position in an adjacent stack by a common substrate of the positive and negative plates. Highly porous, microfine glass fiber separators are positioned between the positive and negative plates and compressive forces are applied to the stack of plates by fixing a battery cover on a container.

In discussing bipolar lead-acid batteries, U.S. Pat. No. 5,068,160 to Clough et al. identifies various problems. One problem which Clough et al. address is the addition of electrolyte to the assembled battery. The thickness of bipolar cells is often significantly less than the thickness of conventional monopolar cells, and such reduced thickness makes filling each of the bipolar cells, which are to be isolated against fluid flow from one cell to the adjacent cell, with a controlled amount of electrolyte, quite difficult, particularly at fill rates used to satisfy commercial production schedules and/or using commercially available equipment. A second problem that Clough et al. address is the need to effectively limit the liquid and/or gaseous components from one bipolar cell from interfering with the functioning of another bipolar cell. It is noted that such cell-to-cell interference can result in a reduction in the overall efficiency of the bipolar battery, or even in battery failure. Yet another problem with bipolar batteries, Clough et al. state, is that of maintaining the spacing between positive and negative electrodes. It is noted that such spacing is particularly important in sealed maintenance-free oxygen recombinant batteries. However, as the dimensions of the bipolar plate surfaces associated with the positive and negative electrodes increase, the more difficult it becomes to maintain proper inter-electrode spacing. The '160 patent to Clough et al. discloses an assembly of plates, spacer members and frame elements preferably made of thermoplastic polymers which are bondable together. As shown in FIG. 4, an assembled battery is illustrated in which bipolar plates are bonded to a frame element. As shown in FIG. 2, the end plate includes a series of apertures. Each of the frame elements include six through-holes, each of which is isolated from the other adjacent through-holes of the individualized frame element. When the battery is assembled, these through-holes are aligned to form six conduits. When the apertures are opened, each of these conduits is in fluid communication with a different one of the open apertures and with only one cell.

Yet, despite the substantial advantages that could be achieved using bipolar batteries and cells and the substantial amount of work and attention directed to this type of battery over at least the last 20 years, it seems that bipolar lead-acid batteries have remained a very promising but elusive curiosity, largely remaining as a laboratory curiosity. Thus, there still exists the need for a well-designed bipolar battery which will achieve the enhanced energy and power densities that only a bipolar battery can provide while satisfactorily dealing with the diverse problems in assembly and design identified by the prior art. More particularly, a substantial need exists for a bipolar battery design composed of components that can be assembled in an automated, reliable fashion, while achieving a well-functioning battery in a cost-effective manner.

It is accordingly a principal object of the present invention to provide a method for assembling a bipolar battery, most preferably a bipolar lead-acid battery, which is amenable to automated production at commercially acceptable production rates, and to the resulting bipolar battery itself.

Another object lies in the provision of modular bipolar battery components that are amenable to automated production techniques.

A further object of this invention provides a bipolar battery design that may be assembled in such a fashion as to minimize the handling of the components so as to minimize scrap loss and the like.

A still further object is to provide a bipolar lead-acid battery design and a method for assembling such bipolar batteries which exhibit the versatility required to accommodate widely varying voltage and capacity specifications necessary for the specific service applications.

Yet another object provides the bipolar battery which is reliable in design and provides satisfactorily leak-free, hermetic seals.

A still further object provides a bipolar lead-acid battery having a unique electrolyte fill/vent design capable of allowing commercially acceptable electrolyte fill rates.

Another and more specific object of the present invention lies in the provision of a bipolar, recombinant lead-acid battery of a design amenable to automated, commercial production.

These and other objects and advantages of the present invention will be apparent from the following description and drawings.

SUMMARY OF THE INVENTION

In general, the present invention is predicated upon the use of modular electrochemical components configured to give the necessary voltage and capacity requirements that are assembled in a unique fashion to provide the bipolar battery. The desired configuration of electrochemical components is then sealed as a unit using assembly components to provide the necessary hermetic and electrolyte-tight seals, thereby obviating the substantial problems that result when an individual component is sealed to an adjacent component, thereby sequentially assembling the necessary electrochemical components. The design of the assembly components allows a commercially practical electrolyte filling operation to be carried out during assembly and satisfactory venting of the resulting battery during service. The electrochemical and assembly components are designed to allow bipolar batteries to be made in an automated fashion while providing a reliable battery from the standpoint of quality and performance. Considerable versatility is achieved due to the modular configuration.

BRIEF DESCRIPTION OF THE DRAWINGS

FIG. 8 is a schematic view and showing the arrangement for a series-only bipolar battery in accordance with the present invention;

FIG. 9 is a schematic view similar to FIG. 8, except showing the appropriate electrical connections for a series/parallel bipolar configuration;

DETAILED DESCRIPTION OF THE INVENTION

Figure 1:
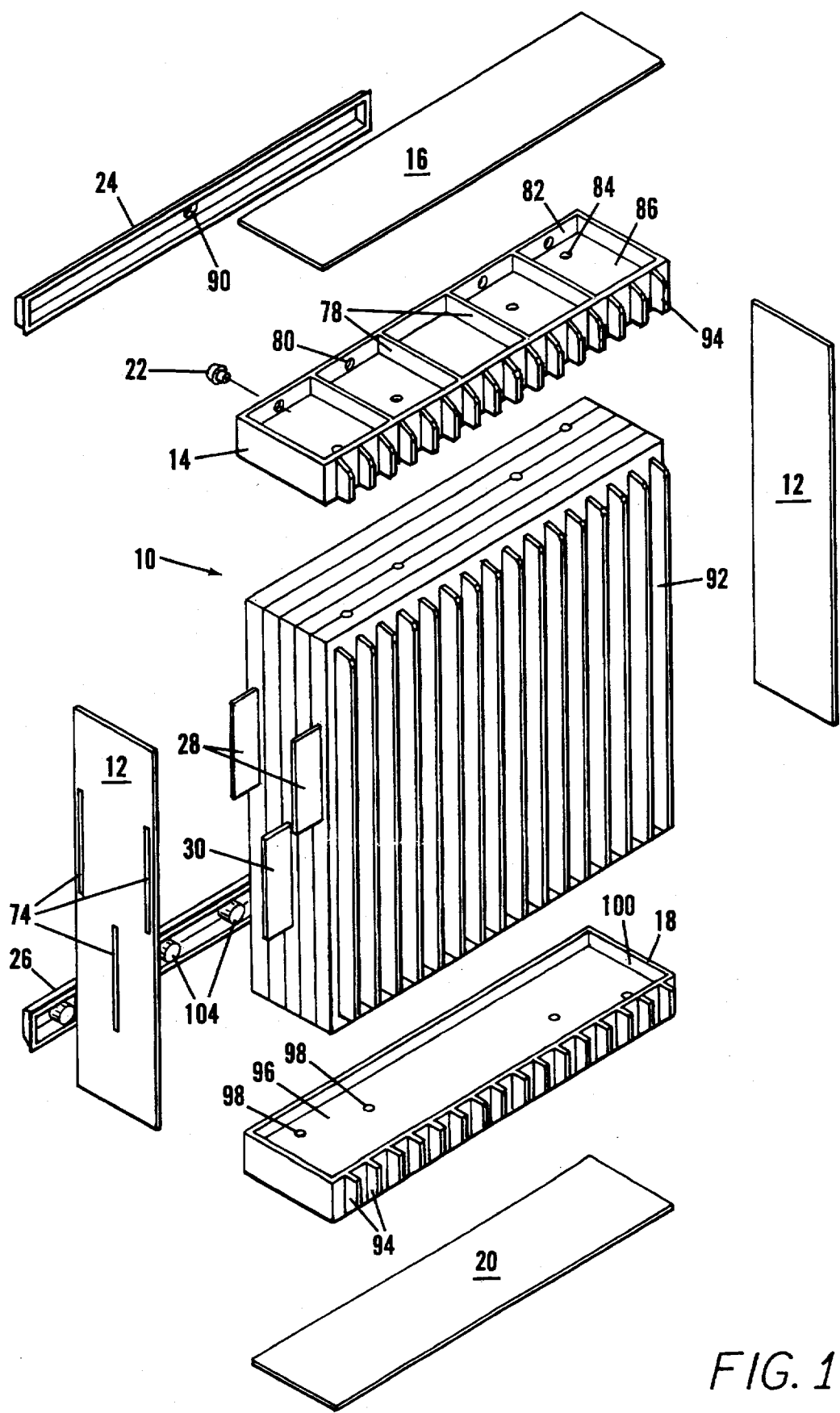
FIG. 1 is an exploded perspective view of a preferred embodiment of a sealed bipolar lead-acid battery of the present invention and showing one configuration of the electrochemical components and the various assembly components.

FIG. 1 shows various components of a preferred embodiment of a bipolar battery of the present invention. The sealed bipolar lead-acid battery illustrated thus comprises modular, electrochemical components, shown generally at 10, dimensioned and configured to provide the desired battery voltage and capacity. The assembly components include side panels 12, fill/vent box 14, fill/vent box cover 16, vacuum box 18, vacuum box cover 20, vent valves 22, active manifold cover 24 and blank manifold cover 26. The desired electrochemical component unit is then assembled using the assembly components to provide the bipolar battery of this invention as will be hereinafter described in more detail.

Positive terminals 28 and negative terminal 30 may be electrically connected by using electrical jumpers/bus bars installed as necessary to provide the electrical connections desired. It will be generally preferred to hold in abeyance installation of such connections until after filling, formation and installation of the vent valves and manifolds. The particular types of electrical connectors utilized may be any of the many types which are known.

Figure 2A:
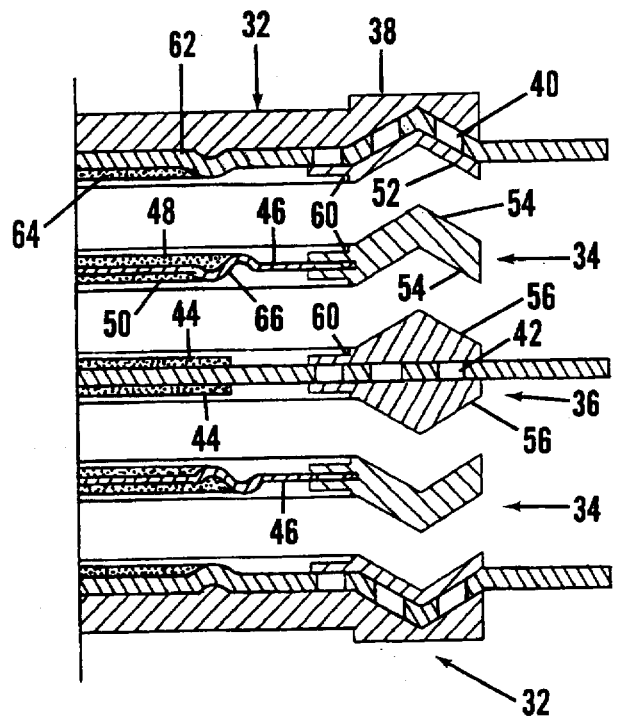
FIG. 2A is a partial cross-sectional view of certain of the electrochemical components utilized in making the bipolar lead-acid of the present invention and which are exploded away to better illustrate the respective components.

In assembling the bipolar battery of this invention, the requisite modular, electrochemical components configured to provide the desired voltage and capacity characteristics are first assembled. In the illustrative embodiment, as shown in FIGS. 2A and B, the modular, electrochemical components comprise end frames 32, active frames 34 and center frame 36. The embodiment shown in FIGS. 2A and B illustrate two 4-volt batteries in parallel. This is achieved by using the unique bipolar design described in U.S. Pat. No. 5,398,817 to Rao et al. identified herein.

More particularly, the end frames 32 comprise a thermoplastic peripheral frame 38 having a conductive member 40 embedded therein. Any conductive member 40 suitable for a bipolar battery may be used. As one illustrative embodiment, the conductive member 40 can comprise a lead or lead alloy-clad copper or copper alloy sheet. Materials of this type are available. The copper sheet provides rigidity, low resistance and current-carrying capability, and such copper sheet can desirably function as the terminals for the battery. The lead alloy sheet functions to provide resistance to corrosion from the sulfuric acid electrolyte employed.

The end frames 32 are unipolar, and both end frames may be pasted to be either positive or negative as is desired. In the embodiment illustrated in FIGS. 2A and B, both end frames 32 have a layer of positive paste adhered to conductive member 40.

Center frame 36 may be made similar to the end frames 32. Thus, center frame 36 may be molded from a thermoplastic material and may utilize a conductive member 42 such as, for example, a lead alloy-clad copper sheet. The lead alloy-clad faces of center frame 36 are coated with conventional lead-acid battery paste. In accordance with the unique design of the bipolar battery described in U.S. Pat. No. 5,348,817 to Rao et al., both faces of the center frame 36 are pasted to be either positive or negative. Whether the center frame is pasted to be positive or negative will depend upon the terminal arrangement desired. When the center frame 36 is pasted to be a central bi-negative plate to provide a negative central terminal (as shown in FIGS. 1–3B), the end frames 32 will be pasted to be positive plates, and vice-versa when a central bi-positive plate is used. Thus, in the illustrative embodiment of FIGS. 2A and B, center frame 36 is pasted with a layer 44 of negative active paste on each face. End frames 32 thus provide the positive terminals 28. Center frame 36 provides the negative terminal 30.

Bipolar active frames 34 may be molded from a thermoplastic material and have embedded therein a conductive member 46. As one illustrative example of a suitable conductive member, a lead alloy sheet, as thin as a foil, may be utilized. Both faces of the lead alloy sheet are coated with conventional lead-acid battery paste, one face being coated with a negative paste layer 48, and the other with a positive paste layer 50.

The entire sheet of conductive member 46 of active frames 34 serve the same purpose as an intercell connector in a conventional lead-acid battery. The high ratio of the intercell connection area to the pasted area and the very short intercell current path gives the bipolar battery design tremendous performance advantages in comparison to conventional lead-acid battery designs.

To form a recombinant or valve-regulated bipolar battery, highly absorbent glass separators made from microfine fibers are utilized. Such glass fiber separators are known and may be used, as may absorbent separators made from the microfine synthetic fibers only or made from a combination of synthetic and glass fibers. The thickness should be such so as to provide the battery with adequate absorptivity so that sufficient electrolyte will be retained to provide the desired capacity.

Figure 2B:
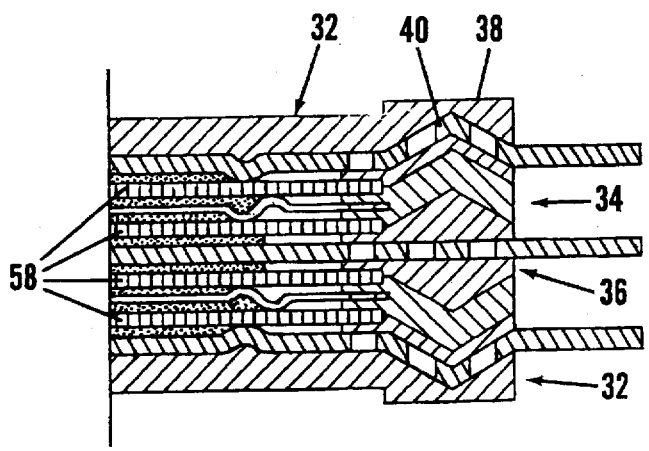
FIG. 2B is a partial cross-sectional view similar to FIG. 2A, except illustrating the various components compressed together with separators positioned between respective components as occurs during assembly.

As is known, to provide the desired compression and spacing, it is necessary to compress the separator by about 15 to 30 percent of that uncompressed thickness. To this end, the end portion 52, 54 and 56 of an end, active and center frame 32, 34 and 36, respectively, are configured to provide the desired compression when compressed together, as is shown in FIG. 2B. Separators 58 are thus compressed between respective frame members. Suitably, each of the respective frame members 32, 34 and 36 include shoulders 60 to hold the separators 58 in position.

When making recombinant batteries, it has generally been found desirable to have more negative paste present than positive active paste. Accordingly, pursuant to one aspect of the present invention, the end frames 32 and active frames 34 each have paste location restraints that simplify the pasting operation by insuring that the respective, relative amount of paste is provided. Thus, conductive member 36 in end frames 32 includes a crimp 62 which functions as a containment and location restraint to control the location of the positive active layer material 64. Similarly, crimp 66 in the conductive member of 46 active frames 34 serves to provide the desired relative location for both the positive paste layer 50 and the negative paste layer 48 adhered to the active frames 34.

The appropriate stacking of the electrochemical components can be seen from FIGS. 2A and B. Each bipolar active frame 34 is positioned such that the negative paste layer 48 faces the positive paste layer 64 of end frame 32. Correspondingly, the positive paste layer 50 of each bipolar active frame 34 faces the negative paste layer 44 of central frame 36. When additional voltage and capacity are desired, additional active frames 34 are employed, positioned in the frame stack as described herein.

It is desirable, as is known in lead-acid battery technology, to leak, or pressure, test by introducing air or the like into the battery. Accordingly, pursuant to one aspect of a more preferred embodiment of the present invention, the electrochemical components may be configured so as to allow such testing prior to final assembly. To this end, sealing means may be incorporated which will allow the electrochemical component stack, when under compression, as is necessary for final assembly, to be subjected to the desired testing, yet that requires only replacement of any component determined defective, rather than scrapping of the battery itself as would occur when such testing is undertaken after final assembly.

Figure 3A:
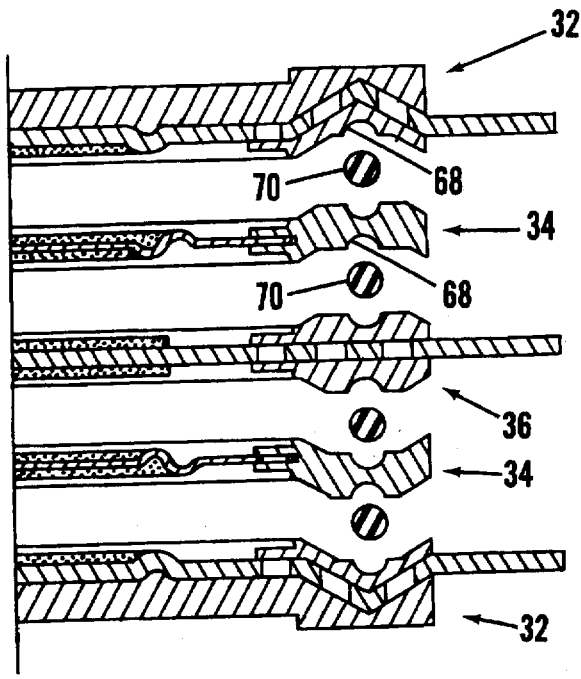
FIG. 3A is a partial cross-sectional view of another embodiment of the electrochemical components that may be used and which are exploded away to illustrate the components.
Figure 3B:
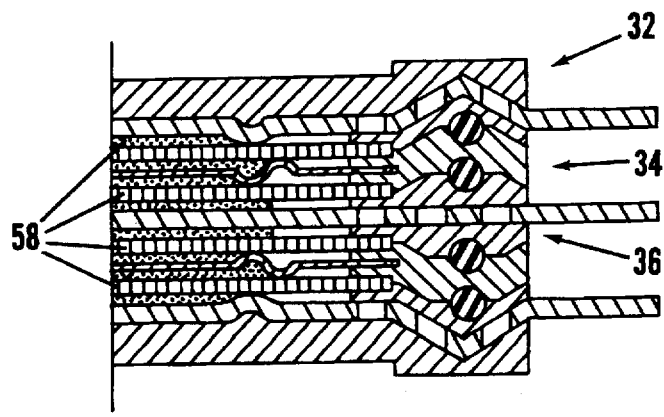
FIG. 3B is a partial cross-sectional view similar to FIG. 3A, except showing the various components compressed together with separators positioned therebetween.

FIGS. 3A and 3B thus illustrate one embodiment of a suitable sealing means to effect such pre-final assembly testing. As shown, adjacent faces of the respective end, active and central frames 32, 34, and 36, respectively, each include a cradle 68, appropriately dimensioned to accept an O-ring 70. When the thus-configured stack is placed under compression as in FIG. 3B, the necessary testing can be undertaken. If leaking results, once the compression is released, the defective component can be identified and removed.

It is preferred to utilize the configuration and design of the electrochemical components as described in the Rao et al. '817 patent. The use of the central bi-positive or bi-negative frame thus achieves an efficient increase in capacity without the need to increase the size of the plates or electrically connecting two or more separate batteries.

However, the bipolar batteries of the present invention may be assembled from other modular electrochemical components and using a conventional bipolar configuration (i.e., all of the plates being bipolar except for the end plates, one being a unipolar positive and the other being a unipolar negative).

A major problem in assembling a bipolar battery using modular plastic frame-type electrochemical components is the manner in which such components are assembled and sealed together. Prior efforts have involved a variety of techniques in which one frame is sealed to an adjacent frame and then another frame is sealed to the prior-sealed frames, thereby building up the desired electrochemical component stack, one component at a time. However, such assembly methods can cause substantial problems, including, inter alia, thermal and/or mechanical degradation of the separator, degraded adhesion of the active material to the conductive metal substrate of the frames and mechanical or other damage to the bipolar plates themselves. Such methods require placing the stack of components under compression in a repeated fashion, and the potentiality of loss of the appropriate compressive control is accordingly enhanced.

Accordingly, pursuant to an important aspect of the present invention, the stack of electrochemical components is subjected to further assembly as a unit; and the necessary hermetic and electrolyte-tight seals are provided by sealing the unit itself (i.e., the stack as a whole is sealed), obviating the substantial potential problems resulting from sealing one frame to another and then another frame to the prior-sealed frames until the desired stack of electrochemical components is assembled.

In accordance with the preferred embodiment as is illustrated in the drawings, the necessary seals are provided by sealing the four open, outside surfaces of the electrochemical component stack (the two end frames, of course, obviating the need for sealing those two surfaces). Effecting the sealing in this fashion contributes to the ability to assemble the bipolar batteries of this invention in automated processing while providing the reliability needed for commercial production. Moreover, this provides the ability to enhance the relative strength of the battery (viz., the strength holding the components together to prevent leakage, loss of performance and the like caused by expansion due to the development of gasses in the battery), as well as providing, in effect, some redundancy in the sealing desired.

The four open, outside surfaces may be sealed in any sequence desired. It thus will be suitable to hold the stack with the desired compression on the closed end surfaces and then seal the four open surfaces.

Figure 4:
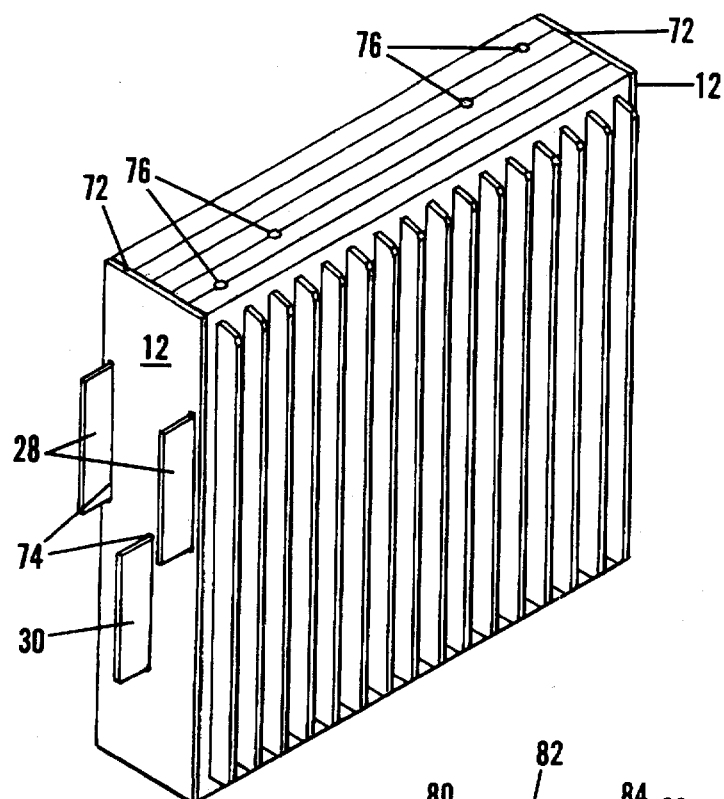
FIG. 4 is a perspective view of the partially-assembled embodiment of FIG. 1 and showing the side panels in their assembled position.

In the illustrative embodiment, as shown in FIG. 4, the side panels 12 are first attached to the side surfaces 72 of the electrochemical component stack shown generally at 10. One of the side panels 12 is desirably provided with apertures 74 dimensioned so that the positive terminals 28 and negative terminal 30 can protrude therethrough. Access to each cell is provided by electrolyte fill/vent holes 76. Fill/vent holes 76 may be molded or drilled into the respective frames.

Figure 5:
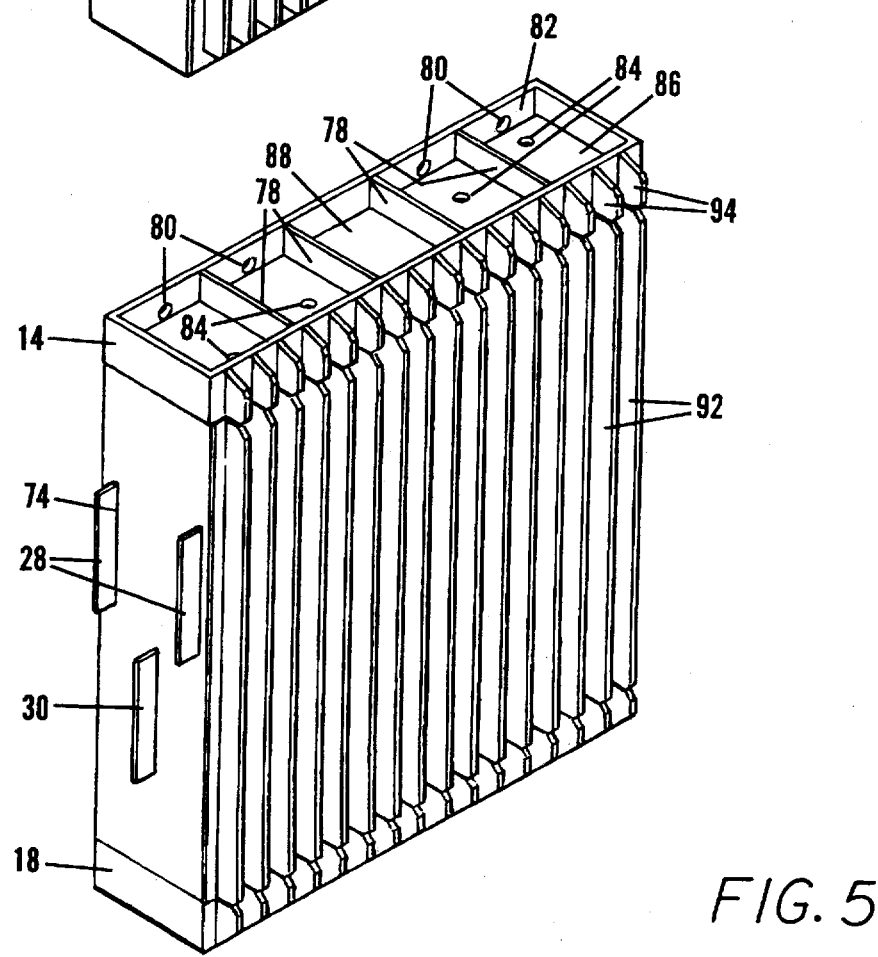
FIG. 5 is a perspective view in a further stage of assembly of the preferred embodiment of FIG. 1 and illustrating the fill/vent and vacuum boxes in their assembled position.

The top and bottom surfaces of the frame stack are then sealed as shown in FIG. 5. The desired compression should also be maintained while this sealing operation is being carried out. To this end, as is shown in FIG. 5, an electrolyte fill/vent box 14 is welded to the top of the frame stack. The fill/vent box 14 is divided into a series of compartments by partitions 78, one compartment being in gas and electrolyte communication with one cell via front aperture 80 in the front panel 82 of fill/vent box 14 and base aperture 84 in the base 86 of the fill/vent box 14, base apertures 84 aligning with fill/vent holes 76 in the frame stack.

Use of the electrolyte fill/vent box 14 not only achieves the necessary sealing of the top surface of the battery but allows commercially acceptable electrolyte filling to be carried out and appropriate venting during service. In this latter regard, a preferred embodiment of the present invention incorporates an explosion-proof valve. To this end, as seen in FIGS. 1 and 5, center compartment 88 is free of any apertures; and, adjacent center compartment 88 an explosion-proof valve 90 (FIG. 1) is positioned in active manifold cover 24. Many explosion-proof valves are known and may be used. In this fashion, any internal gasses vented through valves 22 will exit the battery through explosion-proof vent 90.

In the illustrated and preferred embodiment and as shown in FIG. 5, the electrolyte fill/vent box 14 is dimensioned so as to fit over the top of the stack of the electrochemical components. Such dimensioning facilitates fitment during assembly.

The electrical performance of sealed (i.e., valve-regulated) bipolar lead-acid batteries is predicated upon selected spacing of the plates and separators. Since internal pressures can build up, it is desirable to provide the battery with suitable strength so as to withstand such internal pressures and eliminate, or at least minimize, bulging of the end frames 32. It is accordingly preferred to utilize end frames 32 having spaced, strengthening ribs 92. Electrolyte fill/vent box 14 may also include similarly dimensioned ribs 94 (FIG. 5).

To seal the bottom open surface of the battery, only a flat panel need be used, welded or fused as is desired. However, to facilitate electrolyte filling particularly when the bipolar battery is a valve-regulated type as is illustrated in the drawings, one aspect of this invention utilizes a vacuum box 18. In this fashion, electrolyte can be forced into the separators from one direction and vacuum utilized to pull the electrolyte through the separator from the other direction. Such a push/pull electrolyte filling operation can be quite effective even with separators and plates that are relatively thin, as in a sealed bipolar lead-acid battery.

To accomplish the push/pull filling, holes must be drilled or formed in the bottom of the frames to provide access to the separators; and the vacuum box 18 should have similarly dimensioned holes aligning with the holes in the frame and also apertures to which a suitable vacuum source can be connected. To minimize the number of assembly components, and as shown in the illustrative embodiment, the vacuum box 18 is identical to electrolyte fill/vent box 14. In the assembly position (as best seen in FIG. 1), vacuum box 18 will have its base 96 adjacent the bottom of the battery for sealing. Vacuum holes 98 align with the holes in the bottom of the frames. Vacuum box 18 includes ridge 100 dimensioned to fit over the bottom of the electrochemical component stack, just as the base of the fill/vent box 14 fits over the top of the stack. The vacuum source is applied to vacuum holes 102 (FIG. 7) for carrying out the electrolyte filling operation.

While push/pull electrolyte filling is one desirable sequence, it should be appreciated that many other sequences may likewise be used, as desired. In addition to filling through a push sequence using the electrolyte fill (vent) box 14, a pull/push sequence could also be utilized (viz., pull a vacuum and then push electrolyte through aperture 80). Still further, vacuum box 18 could be employed for electrolyte filling so that electrolyte is pushed through apertures 102, and the vacuum pull is through apertures 80 in electrolyte fill/vent box 14. Vacuum box 18 could also be used for either push or pull/push electrolyte filling, as well. Indeed, such a pull/push or push electrolyte filling sequence could be employed at both the electrolyte fill/vent and vacuum boxes.

Pursuant to one preferred aspect-of the present invention, redundant sealing is effected. More particularly, when the four open surfaces are sealed by using a welding or fusion technique, not only is, for example, the side panel satisfactorily attached to the surface to provide the necessary strength and sealing, but a redundant seal can be provided. Thus, a fusion joint between the interior surfaces of adjoining frames can be achieved, which fusion joint may extend from about 0.05 to 0.10 inch or so from the side panel to the interior of the frames. The seal thus provided during welding or fusing provides a degree of redundancy, resulting in additional strength and hermetic sealing.

Figure 6:
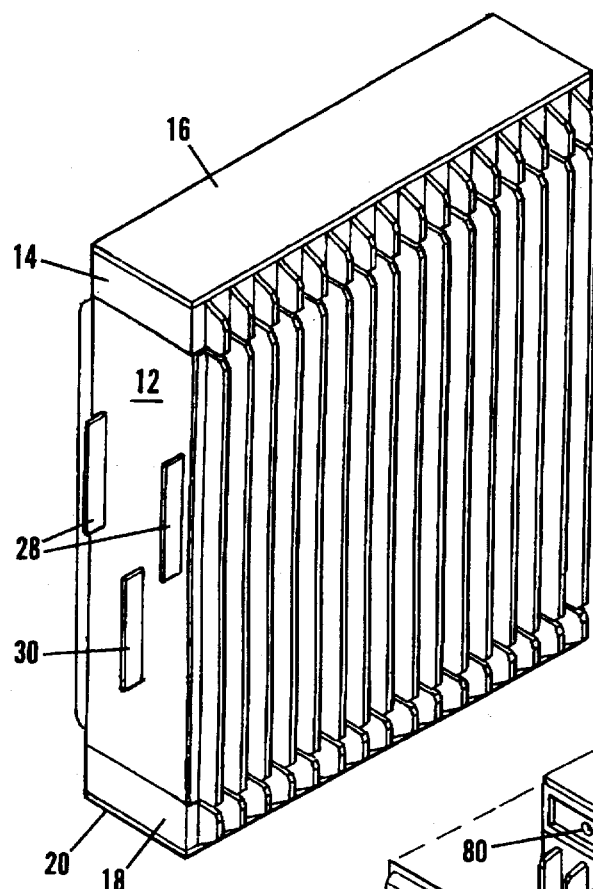
FIG. 6 is a perspective view similar to FIG. 5 and showing the fill/vent and vacuum box covers assembled.

Thermoplastic fill/vent and vacuum box covers 16 and 20, respectively, are then attached, with the resulting battery being shown in FIG. 6. The battery is then ready for filling with electrolyte. To fill each cell of the bipolar battery of the present invention, sulfuric acid electrolyte may be pumped into the fill/vent holes for each cell or sub-atmospheric pressure may be employed to pull the electrolyte into the fill/vent hole for the cell. The battery may then be subjected to conventional formation. Any excess free acid may be then dumped or removed by vacuum from the battery through the fill/vent holes 80.

Suitable pressure valves 22 may then be installed in the fill/vent holes 80 in the fill/vent box 14. A variety of valves are known and may be used, e.g., a Bunsen valve designed to vent when the internal pressure increases to 3–5 psig or so.

Figure 7:
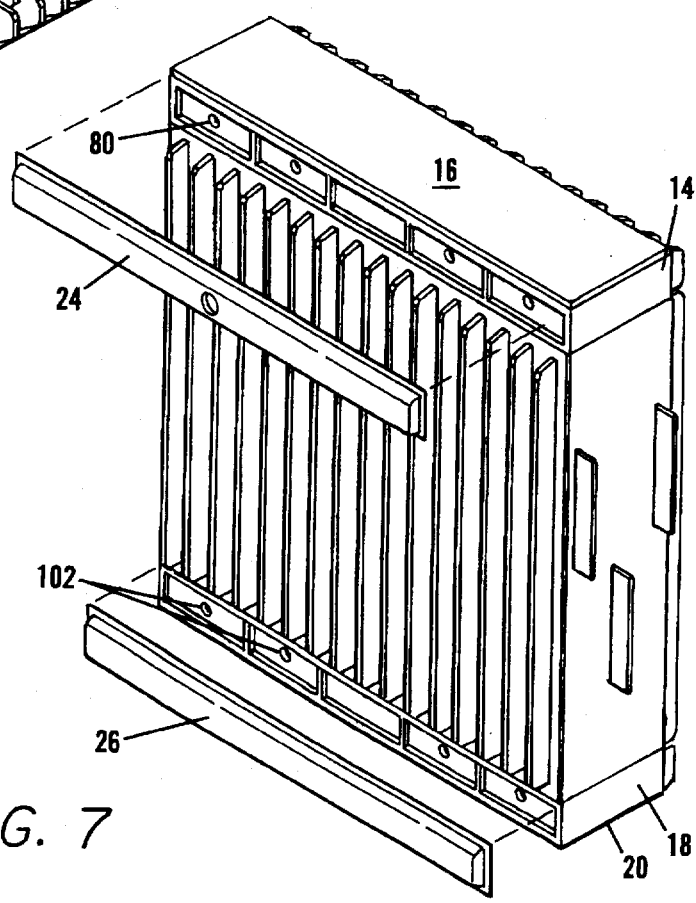
FIG. 7 is a perspective view of the bipolar battery in the preferred embodiment of FIG. 1 and showing the battery prior to assembling the manifold covers.

Thereafter, as shown in FIG. 7, active and blank manifold covers 24 and 26 may then be welded onto fill/vent and vacuum box 14 and 18, respectively. Active manifold cover 24 allows external venting through explosion-proof vent 90 in the event that the internal pressure builds up so that valves 22 release the built-up gasses. Blank manifold cover 26 for vacuum box 18, where no pressure valves 22 are required, may completely seal the fill/vent hole 102 in vacuum box 18 as by closures 104 (FIG. 1).

The capacity of the bipolar batteries of the present invention are determined by the pasted cross-sectional area of the bipolar active frames. If, because of predetermined product application constraints, insufficient battery capacity is derived from an electrical series frame stack, two or more batteries may be configured in an electrical series/parallel arrangement. Thus, as is shown in FIG. 8, a series only arrangement is schematically illustrated having end frames (EF) 32 and center frame (CF) 36. FIG. 9 shows the series/parallel arrangement including end frames (EF) 32, active frames (AF) 34 and center frame (CF) 36.

It should also be appreciated that, for various arrangements, whether a series arrangement or the like is desired, the terminals could be positioned on both sides of the battery rather than on one side as illustrated, or one or both of the terminals may extend from the end frames. In this latter embodiment, it is possible to mold the end frame with the appropriate terminal embedded therein.

Figure 10:
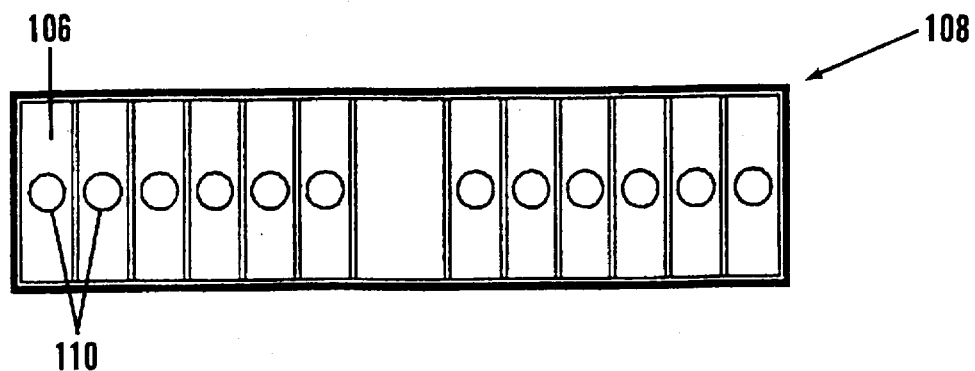
FIG. 10 is a front elevation view of a fill/vent box and illustrating the electrolyte fill holes for a bipolar dual 12-volt battery or a 24-volt battery.

The present invention is highly versatile and may be utilized to provide batteries ranging anywhere from 12 volts or less up to 48 volts or more having widely varying capacities as may be required for the particular application. To this end, FIG. 10 shows one embodiment of a fill/vent box for a dual 12-volt battery arrangement or a 24-volt battery. With the size of the plates and frames desired for many applications (i.e., plates of about 60 in.$^2$ or so), adequate space in the face 106 of the fill/vent box 108 is provided for fill/vent holes 110 of a size for adequate electrolyte filling rates (e.g., about one-half inch in diameter or so).

Figure 11:
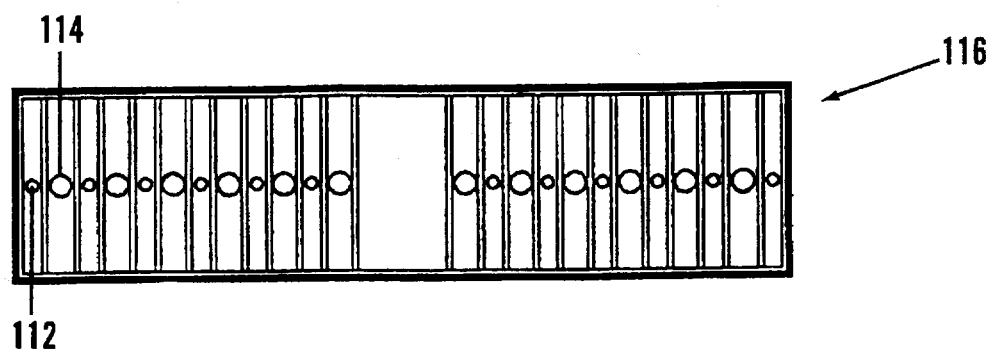
FIG. 11 is a view similar to FIG. 10, except showing the electrolyte fill/vent holes in an arrangement for a 48-volt battery.

When providing a 48-volt battery or dual 24-volt batteries, there may well be inadequate space in the fill/vent box to provide appropriately sized fill/vent holes for each cell in a side-by-side location as with the embodiment of FIG. 10. However, in accordance with the present invention, and as is shown in FIG. 11, dual 24-volt batteries or a single 48-volt battery may be provided with suitable fill/vent means by alternating the vacuum and fill holes, 112 and 114, respectively. This approach can be accommodated because vacuum holes 112 can be of a size smaller than that of the electrolyte fill holes 114 desired for commercial production. In this embodiment, the cells having vacuum holes 112 in the fill/vent box 116 will have a suitably positioned electrolyte fill/vent hole in a fill/vent box that will take the place of the vacuum box 118 of the embodiment of FIGS. 1–7. Stated differently, half of the cells will be filled with electrolyte from the top and the other half of the cells will be filled from the bottom. Accordingly, in this embodiment, the cells are filled with electrolyte, alternatively using either the top or bottom fill/vent box.

Figure 12:
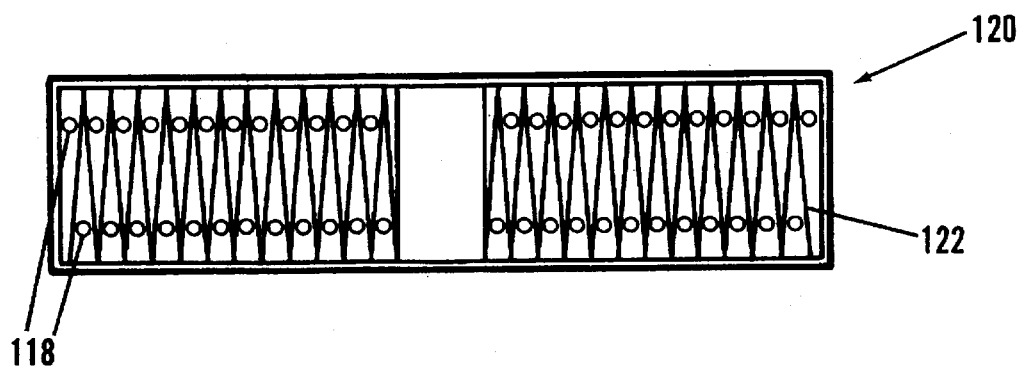
FIG. 12 is a view similar to FIG. 11, except showing an alternative fill/vent box embodiment for a 48-volt bipolar battery in accordance with the present invention.

FIG. 12 sets forth an alternative embodiment for dual 24-volt batteries or a single 48-volt battery in accordance with the present invention. Here, electrolyte fill/vent holes 118 for all the cells are provided in fill/vent box 120. This is accomplished by alternating the positioning of the electrolyte fill/vent holes 118 and utilizing dividers 122 to provide individual electrolyte fill conduits communicating with each cell.

Figure 13:
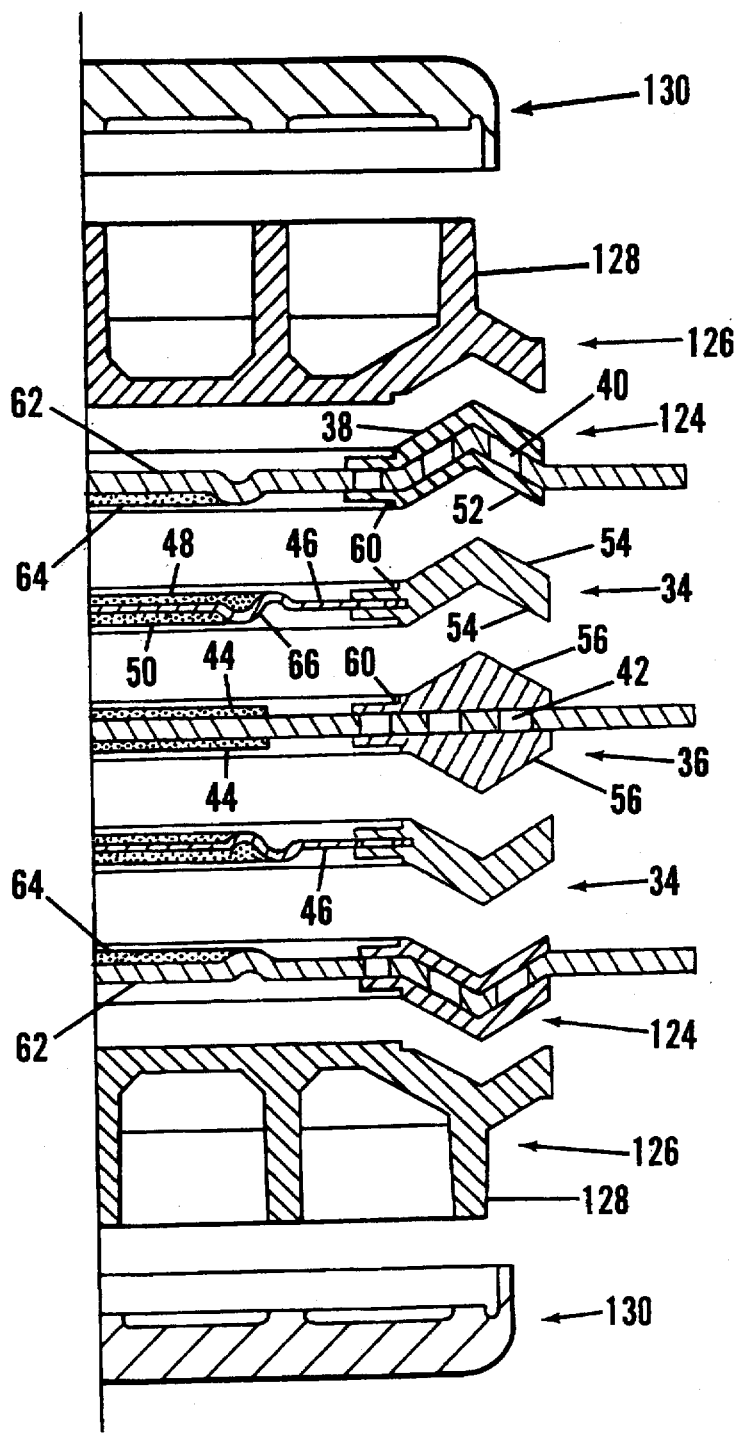
FIG. 13 is a cross-sectional view similar to FIG. 2A and illustrating an alternative embodiment for the end frames and a supplemental stabilizing member.

From the manufacturing standpoint, it may be desirable to make the end frames 32 in two components, rather than as a unitary components, as is shown in FIG. 2A. To this end, and as shown in FIG. 13, while the active frames 34 and center frame 36 are configured as previously described, the end frames 124 are configured similar to active frames 34 and thus do not provide the exterior end surfaces of the battery as in the embodiment of FIG. 2A. A second component, plastic frame 126, provides the exterior end surfaces of the battery; and, in this illustrative embodiment, each plastic frame 126 includes strengthening ribs 128 to assist in preventing bulging of the battery in service. The assembly of the battery using the FIG. 13 embodiment may be carried out as previously described.

A further aspect of this invention comprises utilizing a supplemental strengthening member to provide even further resistance to bulging of the battery during service. To this end, and as shown in FIG. 13, a plastic stabilizing member 130 is provided that can be welded or otherwise attached as desired to each plastic frame 126. Ribs 128 and member 130 should cooperate to provide superior stability during service while not detracting from the ability to assemble the battery of this invention in accordance with the assembly method described herein. The plastic stabilizing member 130 may, of course, be utilized with the embodiment of FIG. 2A, if desired.

The thermoplastic materials used by the respective bipolar battery frames and other components described herein may be any of a variety of materials, as may be desired. In general, suitable materials include, as illustrative examples, unfilled or glass-filled polypropylene homopolymers and copolymers, polyphenylene ethers, polyphenylene sulfides, ABS, PVC, and acrylics. Indeed, any other thermoplastic material may be used that satisfies the criteria for the particular application involved. The principal criteria generally include strength, stiffness, resistance to acid and to oxidation, compatibility in the lead-acid environment and the ability to be molded (e.g., injection molded).

The welding and fusing operations described herein may be achieved by any of a wide variety of known techniques. As illustrative examples, linear vibration welding, orbital planar vibration welding, hot plate welding, focused infrared welding, induction-heated fusion, resistance-heated fusion, solvent welding and even adhesive bonding may be employed. Whatever technique employed, the welded joints/seams should be essentially leak-free, hermetically sealed and liquid-tight at pressures in excess of those expected internal battery service pressures.

Thus, as may be appreciated, the present invention provides a bipolar battery, most preferably a bipolar lead-acid battery, that is assembled of modular electrochemical and assembly components. These components not only provide the desired voltage and capacity requirements for a wide variety of applications, but also are readily amenable to automation and commercial production. These latter advantages are achieved by a configuration in which only the external surfaces of the four open, exposed sides (viz.—the top, bottom and two sides) need be sealed. The need to sequentially weld one component to another, with the attendant problems as previously discussed herein is obviated. The bipolar battery of this invention is likewise amenable to commercially practicable electrolyte filling sequences and achieves satisfactory venting in service.

While the present invention has been illustrated and described herein with respect to certain preferred embodiments, it should be appreciated that the present invention is not so limited. Thus, for example, while the present invention has been described principally in conjunction with a sealed lead-acid battery, it should be appreciated that the present invention is likewise fully applicable to a flooded bipolar lead-acid battery. More particularly, sealed lead-acid batteries (sometimes termed "VRLA" batteries, i.e., valve-regulated lead-acid batteries) are considered to have characteristics that make such batteries highly desirable for many applications. For example, such sealed batteries can be used in any position (e.g., on their side) without concern for electrolyte leakage or the like. However, the advantages of the modular components utilized in the assembly herein will be achieved whether the battery is of a sealed or flooded type.

Indeed, while the present invention offers substantial advantages in conjunction with bipolar batteries of the lead-acid type, it should be appreciated that the present invention is fully applicable to any bipolar battery. The electrochemistry of bipolar batteries using systems other than lead-acid are well known. What the present invention provides is a method of assembling modular components that is amenable to commercial production and the resulting bipolar battery of unique design.

Further, as may be appreciated, the sealing of the external surfaces of the four open, exposed sides may be carried out by any other technique desired. For example, the various assembly components could be first fabricated into a sleeve or open-ended box arrangement into which the electrochemical component stack is inserted prior to sealing. Indeed, the sealing operations needed could be effected by injection molding a thermoplastic material around the electrochemical component stack, utilizing the mold to provide the necessary compression.

Still further, while it is preferred to effect the sealing in the manner described herein due to the reliability and ease in assembly considered provided, it is within the scope of the present invention to seal the electrochemical component stack by welding or fusion designed to join the interior surfaces of adjoining frames, rather than the exterior surfaces. It is thus possible to effect such interior surface sealing by inductor-induction heating (e.g., embedding a metal in the frame), resistance-resistor heating (e.g., providing current through a lead wire or the like), or by adhesive or solvent welding (e.g., adding a pressure-sensitive adhesive, anaerobic adhesive or solvent onto the appropriate areas of the frames and then applying the compressive pressure desired. All such alternatives achieve the desired objective of sealing the electrochemical component stack as a unit. However, each alternative is considered to make assembly somewhat less reliable and more complex in comparison to the preferred embodiment of this invention.

What is claimed:

1. A method of making a bipolar battery, which method comprises:

providing a pair of end frames, each of the end frames having a body portion, said body portion defining an exterior surface, a top surface, a bottom surface, side surfaces, and an interior surface, said interior surface including a peripheral border; a conductive metal substrate embedded in the body portion of the end frame; and a layer of positive or negative active material adhered to the conductive metal substrate of the end frame;

providing a plurality of intermediate frames, each of the intermediate frames having a body portion, said body portion defining a top surface, a bottom surface, side surfaces, and interior surfaces, said interior surfaces including peripheral borders; a conductive metal substrate embedded in the body portion of the intermediate frame; and a layer of positive or negative active material adhered to each surface of the conductive metal substrate of the intermediate frame;

providing a plurality of separators;

assembling the end frames, intermediate frames, and separators so that the peripheral boarders of adjacent end and intermediate frames abut to form an electrochemical component unit, said electrochemical component unit having a plurality of electrochemical cells, a top surface, a bottom surface, and side surfaces corresponding, respectively, to the top surface, bottom surface, and side surfaces of the end and intermediate frames, and end surfaces corresponding to the exterior surfaces of the end frames;

providing each electrochemical cell with an opening in the top surface of the electrochemical unit and an opening in the bottom surface of the electrochemical unit, one of said cell openings associated with each cell being an electrolyte fill/vent hole and the other said cell hole associated with each cell being a vacuum hole;

sealing the side surfaces of the electrochemical component unit with a panel;

providing a top box including a base, the base defining a plurality of compartments, each said base compartment having a hole therein, said top box base compartment holes being in alignment with the cell openings in the top surface of the electrochemical component unit; a front panel having an aperture communicating with each top box base compartment; and an open top;

sealing the base of the top box to the top surface of the electrochemical component unit, thereby providing communication between the cell openings in the top surface of the electrochemical component unit and their associated top box base compartment holes, top box compartments, and top box front panel apertures;

providing a bottom box including a base, the base defining a plurality of compartments, each said base compartment having a hole therein, said bottom box base compartment holes being in alignment with the cell openings in the bottom surface of the electrochemical component unit; a front panel having an aperture communicating with each bottom box base compartment; and an open top;

sealing the base of the bottom box to the bottom surface of the electrochemical component unit, thereby providing communication between the cell openings in the bottom surface of the electrochemical component unit and their associated bottom box base compartment holes, bottom box compartments, and bottom box front panel apertures;

providing covers for the open tops of the top box and bottom box;

sealing the top and bottom box covers to the open tops of the top box and bottom box;

filling each cell with electrolyte by introducing electrolyte into the top or bottom box front panel aperture in communication with the electrolyte fill/vent hole of the cell while applying a vacuum to the top or bottom box front panel aperture in communication with the vacuum hole of the cell;

providing covers for the front panels of the top box and bottom box; and sealing the front panel covers over the front panels of the top box and bottom box.

2. The method of claim 1, wherein the cell openings in the top surface of the electrochemical component unit are electrolyte fill/vent holes and the cell openings in the bottom surface of the electrochemical component unit are vacuum holes; wherein the front panel cover for the top box is a manifolding cover; and wherein the front panel cover for the bottom box blocks off the bottom box front panel apertures.

3. The method of claim 2 wherein the top box base defines a chamber without an aperture, wherein the front panel cover for the top box includes an explosion-proof vent, and wherein the sealed front panel cover for the top box is positioned such that the explosion-proof vent is juxtaposed adjacent said chamber.

4. The method of claim 1 wherein the bipolar lead-acid battery is a sealed battery, wherein said separators are compressible separators, and wherein the electrochemical component unit is compressed so as to compress said separators prior to sealing the top, bottom and side surfaces of the electrochemical component unit.

5. The method of claim 4 wherein said intermediate frames comprise a plurality of active bipolar frames, each of said active bipolar frames having a layer of positive active material and a layer of negative active material, and a central bi-plate frame, the central bi-plate frame having layers of active material opposite in polarity to the active material of the end frames, the active bipolar frames and the central bi-plate frame being positioned in the electrochemical component unit to provide two batteries in parallel.

6. The method of claim 5 wherein the peripheral border of each end and intermediate frame is configured to provide compression upon assembly of the electrochemical component unit.

7. The method of claim 5 wherein the peripheral border of each end and intermediate frame includes a shoulder aligned to accept one of the separators in the assembly of the electrochemical component unit.

8. The method of claim 7 wherein the conductive metal substrate of the end and bipolar frames includes an active material location restraint for retaining the active material.

9. The method of claim 6 wherein the end frames have strengthening ribs dimensioned and positioned to minimize bulging of the battery during service.

10. The method of claim 9 wherein the body portion of each end frame comprises two components, one component comprising the interior surface including the peripheral border and having the conductive metal substrate embedded therein and the other component comprising the exterior surface and having the strengthening ribs therein.

11. The method of claim 9 wherein a plastic stabilizing member is attached to the end frame.

12. The method of claim 9 wherein the top and bottom boxes have strengthening ribs aligning with the ribs on the end frames in the assembled battery.

13. The method of claim 5 wherein the conductive metal substrate of said central bi-plate frame extends through one of the side surfaces of the electrochemical component unit so as to provide either a positive or negative terminal, wherein the conductive metal substrates of said end frames extend through said side surface of the electrochemical component unit so as to provide terminals of a polarity opposite to the polarity of the central bi-plate frame terminal, and wherein one of the panels to be sealed to the side surfaces of the electrochemical component unit has openings dimensioned and aligned so as to allow said panel to be sealed to said side surface of the electrochemical component unit with the terminals extending therethrough.

14. The method of claim 1 wherein the cell holes are provided by indentations molded in the frames.

15. The method of claim 1 wherein the sealing steps simultaneously seal at least a portion of the abutting peripheral borders of adjacent frames.

16. The method of claim 1 wherein the base of the top and bottom boxes are dimensioned and configured so as to provide a ridge which fits over, respectively, the top and bottom surfaces of the electrochemical component unit.

17. A method of making a bipolar battery, which method comprises:

providing a pair of end frames, each of the end frames having a body portion, said body portion defining an exterior surface, a top surface, a bottom surface, side surfaces, and an interior surface, said interior surface including a peripheral border; a conductive metal substrate embedded in the body portion of the end frame; and a layer of positive or negative active material adhered to the conductive metal substrate of the end frame;

providing a plurality of intermediate frames, each of the intermediate frames having a body portion, said body portion defining a top surface, a bottom surface, side surfaces, and interior surfaces, said interior surfaces including peripheral borders; a conductive metal substrate embedded in the body portion of the intermediate frame; and a layer of positive or negative active material adhered to each surface of the conductive metal substrate of the intermediate frame;

providing a plurality of separators;

assembling the end frames, intermediate frames, and separators so that the peripheral boarders of adjacent end and intermediate frames abut to form an electrochemical component unit, the separators being compressed thereby, said electrochemical component unit having a plurality of electrochemical cells, a top surface, a bottom surface, and side surfaces corresponding, respectively, to the top surface, bottom surface, and side surfaces of the end and intermediate frames, and end surfaces corresponding to the exterior surfaces of the end frames;

providing each electrochemical cell with an electrolyte fill/vent opening in the top surface of the electrochemical unit;

sealing the side surfaces of the electrochemical component unit with a panel;

providing an electrolyte fill/vent box including a base, the base defining a plurality of compartments, each said base compartment having a hole therein, said base compartment holes being in alignment with the electrolyte fill/vent holes in the top surface of the electrochemical component unit; a front panel having an aperture communicating with each base compartment; and an open top;

sealing the base of the electrolyte fill/vent box to the top surface of the electrochemical component unit, thereby providing communication between the electrolyte fill/vent holes in the top surface of the electrochemical component unit and their associated top box base compartment holes, top box compartments, and top box front panel apertures;

providing a cover for the open top of the electrolyte fill/vent box;

sealing the electrolyte fill/vent box cover to the open top of the electrolyte fill/vent box;

sealing the bottom surface of the electrochemical component unit with a panel;

adding electrolyte to each cell by introducing electrolyte into the electrolyte fill/vent box front panel apertures;

inserting valves in the electrolyte fill/vent box front panel apertures adapted to maintain the internal pressure within the battery;

providing a manifolding cover for the front panel of the electrolyte fill/vent box; and sealing the front panel cover over the front panel of the electrolyte fill/vent box.

18. The bipolar battery of claim 17 wherein at least a portion of said peripheral borders of adjacent frames are sealed.

19. The bipolar battery of claim 18 wherein each end frame comprises two components, one component comprising the interior surface comprising the peripheral border defining the central open area with the conductive metal substrate positioned therein and the other component comprising the solid exterior surface having the strengthening ribs therein.

20. A bipolar battery having a desired voltage and capacity which comprises a set of end frames each having a solid exterior surface, top, bottom and side surfaces and an interior surface comprising a peripheral border defining a central open area sized to accommodate a first conductive metal substrate, said first conductive metal substrate being embedded in each of said end frames and positioned in said central open area, a first layer of positive or negative active material adhered to each of said first conductive metal substrates, a series of other frames having top, bottom and side surfaces and a peripheral border defining a central open area sized to accommodate a second conductive metal substrate, said second conductive metal substrate embedded in each of said other frames and positioned in the central open area, a second layer of either positive or negative active material adhered to each surface of each of said second conductive metal substrates embedded in said other frames, said end frames and said other frames being juxtaposed adjacent one another and comprising an electrochemical component unit having top, side and bottom surfaces corresponding to the respective top, side and bottom surfaces of said frames with the exterior surfaces of the end frames comprising the end surfaces of the electrochemical component unit and the peripheral surfaces of adjacent frames forming peripheral surfaces therebetween, the frames in the unit being assembled so as to have each layer of positive active material in said first and second layers adjacent a negative active material layer in said first and second layers, a separator positioned between adjacent positive and negative active material layers from said first and second layers, an electrolyte fill/vent hole in the top and bottom surfaces of said unit in communication with a separator, a panel sealed to the side surfaces of said electrochemical component unit, an electrolyte fill/vent box comprising a base divided into compartments equal in number to the number of separators and having electrolyte fill/vent holes in alignment with the holes in the top surface of said electrochemical component unit, a front panel having a series of apertures, one aperture communicating with each compartment and an open top, the base of said electrolyte fill/vent box being sealed to the top surface of the electrochemical component unit and an electrolyte fill/vent box cover being sealed thereto to close the open top, a vacuum box comprising a base divided into compartments equal in number to the number of separators having holes aligning with the holes in the bottom surface of the electrochemical component unit, a front panel having a series of apertures, one aperture communicating with each compartment and an open top, the base of said vacuum box being sealed to the bottom surface of the unit via the base, a manifold cover for the electrolyte fill/vent box sealed to the front panel of said electrolyte fill/vent box and a vacuum box cover being sealed thereto to close the open top, a vacuum box manifold cover having closures for blocking off the front panel vacuum box apertures and sealed to the vacuum box so that said closures block off the front panel vacuum box apertures, and electrolyte being positioned between adjacent active material layers of positive and negative active material.

21. The bipolar battery of claim 20 wherein the bipolar battery is a sealed battery, said separators being suitable for sealed lead-acid batteries and having an uncompressed thickness and wherein the thickness of said separator in said electrochemical unit is less than said uncompressed thickness.

22. The bipolar battery of claim 21 wherein the peripheral borders adjacent the side surfaces of each frame include a shoulder aligned to accept a separator.

23. The bipolar battery of claim 22 wherein each of said first and second conductive metal substrates embedded in said end and bipolar frames includes an active material location restraint.

24. The bipolar battery of claim 22 wherein each conductive metal substrate embedded in the end and bipolar frames includes an active material location restraint for retaining the active material in the desired location.

25. The bipolar battery of claim 20 wherein said other frames comprise active bipolar frames wherein said second layer of positive active material is adhered to one side and second layer of negative active material is adhered to the other side of said second conductive metal substrates and a central bi-plate frame having a third layer of active material adhered to each side of a third conductive metal substrate embedded in said bi-plate frame opposite in polarity to said first layer of active material adhered to said first conductive metal substrate embedded in said end frames.

26. The bipolar battery of claim 25 wherein the conductive metal substrate in said central bi-plate extends through a side surface of the electrochemical component unit so as to provide either the positive or negative terminal and the conductive metal substrates in said end frames extend through the side of the electrochemical component unit so as to provide terminals of a polarity opposite to that of the central bi-plate.

27. The bipolar battery of claim 25 wherein the peripheral border adjacent the side surfaces of each frame is configured to provide a thickness of said separator upon assembly of the electrochemical component unit less than said uncompressed thickness.

28. The bipolar battery of claim 20 wherein the electrolyte fill/vent hole in the top and bottom surfaces comprises suitably configured indentations in the appropriate frame surfaces.

29. The bipolar battery of claim 20 wherein said electrolyte fill/vent box includes at least one compartment more than the number of separators and said additional compartment being without an aperture in the front panel, the manifold cover for the electrolyte fill/vent box includes an explosion-proof vent and the sealed manifold cover for the electrolyte fill/vent box is positioned such that the explosion-proof vent is juxtaposed adjacent to the compartment without an aperture in the front panel.

30. The bipolar battery of claim 20 wherein said end frames have strengthening ribs dimensioned and positioned to minimize bulging of the battery during service.

31. The bipolar battery of claim 30 wherein each end frame is a unitary component.

32. The bipolar battery of claim 30 wherein a plastic stabilizing member is attached to the end frame.

33. The bipolar battery of claim 30 wherein the electrolyte fill/vent and vacuum boxes have strengthening ribs aligning with the ribs on said end frames.

34. The bipolar battery of claim 20 wherein the base of the electrolyte fill/vent and vacuum boxes are dimensioned and configured so as to provide a ridge fitting over, respectively, the top and bottom surfaces of the electrochemical component unit.

* * * * *

UNITED STATES PATENT AND TRADEMARK OFFICE
CERTIFICATE OF CORRECTION

PATENT NO. : 5,682,671
DATED : November 4, 1997
INVENTOR(S) : LUND et al.

It is certified that error appears in the above-identified patent and that said Letters Patent is hereby corrected as shown below:

In Claim 9, Column 14, line 25: "6" should read --8--.

Signed and Sealed this

Twenty-second Day of June, 1999

Attest:

Q. TODD DICKINSON

*Attesting Officer*   Acting Commissioner of Patents and Trademarks